US008346011B2

(12) United States Patent
Kelm et al.

(10) Patent No.: US 8,346,011 B2
(45) Date of Patent: Jan. 1, 2013

(54) REDUCING NOISE IN AN IMAGE

(75) Inventors: Zachary Kelm, Rochester, MN (US);
Daniel Blezek, Rochester, MN (US);
Bradley Erickson, Rochester, MN (US);
Brian Bartholmai, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 392 days.

(21) Appl. No.: 12/823,377

(22) Filed: Jun. 25, 2010

(65) Prior Publication Data

US 2011/0019935 A1    Jan. 27, 2011

Related U.S. Application Data

(60) Provisional application No. 61/220,807, filed on Jun. 26, 2009.

(51) Int. Cl.
*G06K 9/40* (2006.01)
(52) U.S. Cl. ........................................ 382/275; 382/270
(58) Field of Classification Search ........................ None
See application file for complete search history.

(56) References Cited

U.S. PATENT DOCUMENTS

| | | | |
|---|---|---|---|
| 5,768,134 A | 6/1998 | Swaelens et al. | |
| 2006/0029285 A1* | 2/2006 | Hein et al. | 382/260 |
| 2007/0183564 A1* | 8/2007 | Li et al. | 378/22 |

OTHER PUBLICATIONS

Buades et al., "A Review of Image Denoising Algorithms, With a New One," *Multiscale Modeling and Simulation*, 2005, 4(2):490-530.
Brenner and Hall, "Computed Tomography—An Increasing Source of Radiation Exposure," New England Journal of Medicine, 2007, 357(22):2277-2284.
Brox et al., "Efficient Nonlocal Means for Denoising of Textural Patterns," *IEEE Trans. on Medical Image Processing*, Jul. 2008, 17(7):1083-1092.
Coupé et al., "An Optimized Blockwise Nonlocal Means Denoising Filter for 3-D Magnetic Resonance Images," *IEEE Trans. on Medical Imaging*, 2008, 27(4):425-441.
Coupé et al., "Fast Non Local Means Denoising for 3D MR Images," 2006, in MICCAI '06, LNCS 4191, pp. 33-40.
Darbon et al., "Fast Nonlocal Filtering Applied to Electron Cryomicroscopy," *Proceedings of ISBI*, 2008, pp. 1331-1334.
Kelm et al., "Optimizing non-local means for denoising low dose CT," *IEEE International Symposium on Biomedical Imaging: From Nano to Macro*, 2009, pp. 662-665.
Manjón et al., "MRI denoising using non-local means," *Medical Image Analysys*, 2008, 12:514-523.

* cited by examiner

*Primary Examiner* — Andrew W Johns
*Assistant Examiner* — Siamak Harandi
(74) *Attorney, Agent, or Firm* — Fish & Richardson P.C.

(57) ABSTRACT

A computer-implemented method for reducing noise in an image includes receiving a first image in a computer system. The first image depicts an interior of an item and is generated using a technique that provides imaging at selected depths in the item. The first image represents a first interior section having a first thickness. The method includes determining a modification for the first image using a second image of the interior. The second image represents a second interior section encompassing the first interior section and has a second thickness greater than the first thickness. The method includes storing the modification in association with the first image.

20 Claims, 9 Drawing Sheets

REDUCING NOISE IN AN IMAGE

RELATED APPLICATIONS

This application claims the benefit of U.S. Provisional Application Ser. No. 61/220,807, filed Jun. 26, 2009, which is incorporated herein by reference.

TECHNICAL FIELD

This document relates to image processing.

BACKGROUND

It is important to consider the deleterious effects of ionizing radiation when determining the use of computer tomography (CT) within medicine. For some patients, repeat scans are necessary for monitoring high risk situations. In these cases, it is beneficial to minimize the radiation dose of each scan to reduce the cumulative dose over time. However, the signal-to-noise level of low dose CT scans is significantly lower than for normal dose scans, and thus may cause a decrease in diagnostic accuracy.

SUMMARY

In a first aspect, a computer-implemented method for reducing noise in an image includes receiving a first image in a computer system. The first image depicts an interior of an item and is generated using a technique that provides imaging at selected depths in the item. The first image represents a first interior section having a first thickness. The method includes determining a modification for the first image using a second image of the interior. The second image represents a second interior section encompassing the first interior section and has a second thickness greater than the first thickness. The method includes storing the modification in association with the first image.

Implementations can include any or all of the following features. The technique can include at least one selected from: computer tomography, ultrasound, sound waves, electromagnetic waves, magnetic resonance imaging, magnetic resonance elastography, and combinations thereof. The first image can be generated by applying an interpolation procedure to the second image. Also a third image can be used in determining the modification, the third image representing a third interior section adjacent the first interior section and having a third thickness less than the second thickness. The first and second images can include pixels, and the modification can be stored by adjusting an intensity of a first-image pixel based at least in part on an intensity of a second-image pixel. Also other first-image pixels from the first image can be used in determining the modification. The second-image pixel can be identified by determining a similarity between: (i) a first patch of the first image that includes the first-image pixel and (ii) a second patch of the second image that includes the second-image pixel.

In a second aspect, a computer-implemented method for reducing noise in an image includes receiving a first image in a computer system, the first image depicting an interior of an item and being generated using a technique that provides imaging at selected depths in the item, the first image representing a first interior section having a first thickness. The method includes determining a modification for the first image using at least second and third images of the interior representing second and third interior sections, respectively, adjacent the first interior section, the second interior section having a second thickness greater than a third thickness of the third interior section. The method includes storing the modification in association with the first image.

Implementations can include any or all of the following features. The first image can be generated by applying an interpolation procedure to the second image. The first, second and third images can include pixels, and the modification can be stored by adjusting an intensity of a first-image pixel based at least in part on intensities of a second-image pixel and a third-image pixel. Also other first-image pixels from the first image can be used in determining the modification. The second and third interior sections can abut a common side of the first interior section. The second and third interior sections can abut separate sides of the first interior section.

A method can be implemented using a computer program product tangibly embodied in a computer-readable storage medium and including instructions that when executed by a processor perform the method.

In a third aspect, a system includes a data storage device having stored therein first and second images representing first and second interior sections, respectively, of an item. The first and second images are generated using a technique that provides imaging at selected depths in the item, the first interior section encompassed by the second interior section and having a first thickness less than a second thickness of the second interior section. The system includes a noise detecting component determining a modification for the first image using the second image.

Implementations can include any or all of the following features. The system can include a scanner generating an output that at least partially enters the item; and a detector detecting the output from the scanner and generating at least the second image. The scanner can use a technique selected from: computer tomography, ultrasound, sound waves, electromagnetic waves, magnetic resonance imaging, magnetic resonance elastography, and combinations thereof. The system can include an interpolating component that generates the first image by applying an interpolation procedure to the second image. The first and second images can include pixels, and the noise detecting module can determine the modification setting an intensity of a first-image pixel in the first image based at least in part on an intensity of a second-image pixel in the second image.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
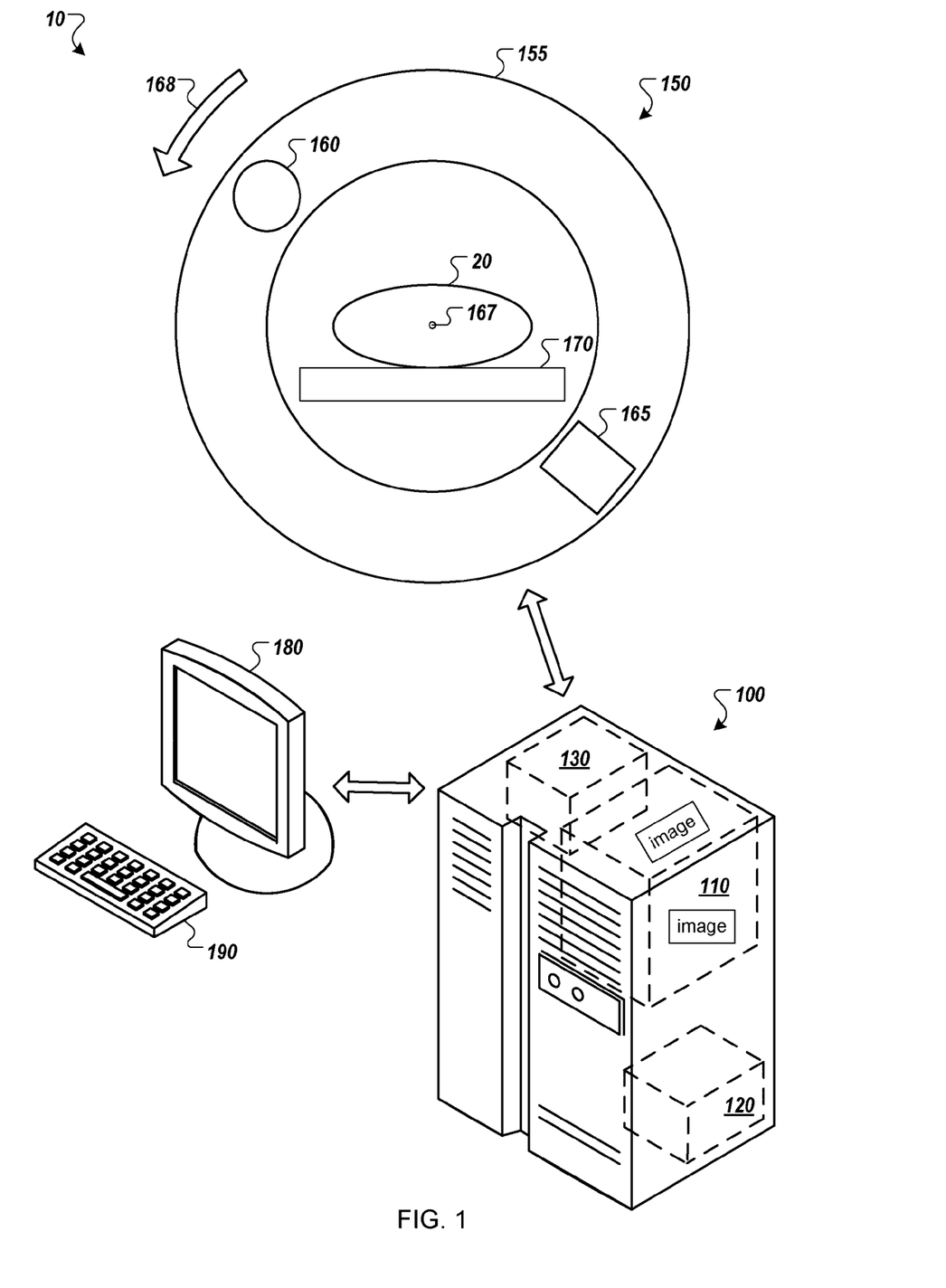
FIG. 1 schematically shows an example of an imaging system.

FIG. 1 shows a high level representation of an exemplary imaging system 10 for modifying images, for example to minimize or remove noise from an image computed from data captured during a CT scan. The system 10 includes a controller device 100 and an imaging device 150 that can communicate with each other and/or with I/O devices (e.g., an LCD display 180, an input device 190, and the like). The controller device 100 includes, for example, electronic equipment for storing information (e.g., images) reflecting the interior of one or more items. The controller device 100 can modify such information obtained about one or more items, such as information obtained during scans of a human body. The imaging device 150 can include equipment for capturing imaging data (e.g., by CT scan), for example to conduct measurements on an item (e.g., a human). The imaging device 150 can communicate such information measured from one or more items to the controller device 100, which can subsequently store and/or modify the information (e.g., to remove noise). The display 180 and input device 190 can be used to display output (e.g., images) from the controller device 100 and to provide input to the controller device 100.

In some embodiments, the controller device 100 can include a data storage component 110 used to store image information measured by the imaging device 150. For example, the imaging device 150 can perform one or more image measurements of the interior of a human patient using computed tomography (CT). Thereafter, information indicative of the one or more image measurements can be communicated to the controller device 100 and stored in the storage component 110. The controller device 100 can include a noise detecting component 120 used to identify artifacts in the image information stored in the storage component 110. For example, the noise detecting component 120 can be used to identify artifacts from a first image, such as image noise, that are not part of the image detail and thus not indicative of the interior of the item measured. The noise detecting component, which can be implemented for example, in hardware, firmware, software, and the like, can use information from a second image to identify the image noise from the first image. The noise detecting component 120 can be used to determine one or more modifications that can be made to the first image to reduce or eliminate the identified noise. After modification, the first image may more accurately represent the interior of the item measured.

In some embodiments, the controller device 100 can include an interpolation component 130 that can be used to generate images from data collected during a CT scan. For example, data used to compute a high-resolution thin slice CT image can also be interpolated to compute a low-noise thick slice image. The thick slice image can be stored and used by the noise detecting component 120 to reduce or eliminate the noise in the high-resolution thin slice CT image.

In some embodiments, the imaging device 150 can include a doughnut-shaped housing 155, one or more emission components 160 used to emit energy (e.g., x-ray radiation) that can at least partially enter an item to be measured and one or more detection components 165 that can detect the emissions from the one or more emission components 160 and can generate image information reflecting the interior of the item. For example, the imaging system 10 can be used to scan at least a portion of the interior of a patient 20. During a scan, the patient 20 can lie on a table 170 that is part of the imaging device 150. The emission component 160 can emit energy (e.g., x-ray radiation), through the patient 20, that is received by the detection component 165 located on the opposite side of (e.g., about 180 degrees around) the housing 155. During one cycle of the imaging device 150, the emission component 160 and the detection component 165 can synchronously rotate 360 degrees around an axis 167 (e.g., as shown by arrow 168) while the emission component 160 remains 180 degrees from the detection component 165. During one cycle of the imaging device 150, the detection components 165 can capture data which can be used to calculate one or more two-dimensional images (e.g., two images per detection component 165), each representing a slice (e.g., 1.5 mm thick and 5 mm thick) of the patient scanned. Additional images of the interior of the patient 20 can be obtained by iteratively offsetting the housing by a distance (e.g., 5 mm) longitudinally along the axis 167 and completing additional scan cycles.

Still referring to FIG. 1, in some embodiments, the system 10 can perform a method for reducing noise in an image. The controller device 100 can receive a first image depicting an interior of an item. The first image can be generated from data captured by the imaging device 150 using a technique that provides imaging at selected depths in the item, such as a CT scan, representing a first interior section having a first thickness. The controller device 100 can determine a modification for the first image using a second image of the interior, where the second image represents a second interior section encompassing the first interior section and has a second thickness greater than the first thickness. Subsequently, the controller device 100 can store the modification in association with the first image.

As another example, the controller device 100 can determine a modification to be made to the first image using at least second and third images of the interior, where the second and third images represent second and third interior sections, respectively, adjacent the first interior section. The second and third interior sections can have second and third thickness, respectively, where the second thickness is thicker than the third thickness. Subsequently, the controller device 100 can store the modification in association with the first image.

In particular embodiments, the controller device 100 can improve the signal-to-noise ratio of low-dose CT scans. For example, CT image information used to compute a thin image reconstruction can be used by the controller device 100 to compute a thicker image reconstruction with a better signal-to-noise ratio that the thin image reconstruction. Subsequently, the controller device 100 can use the thicker image reconstruction to improve the signal-to-noise ratio of the thin image reconstruction, while maintaining the higher resolution of the thin image reconstruction.

Figure 2:
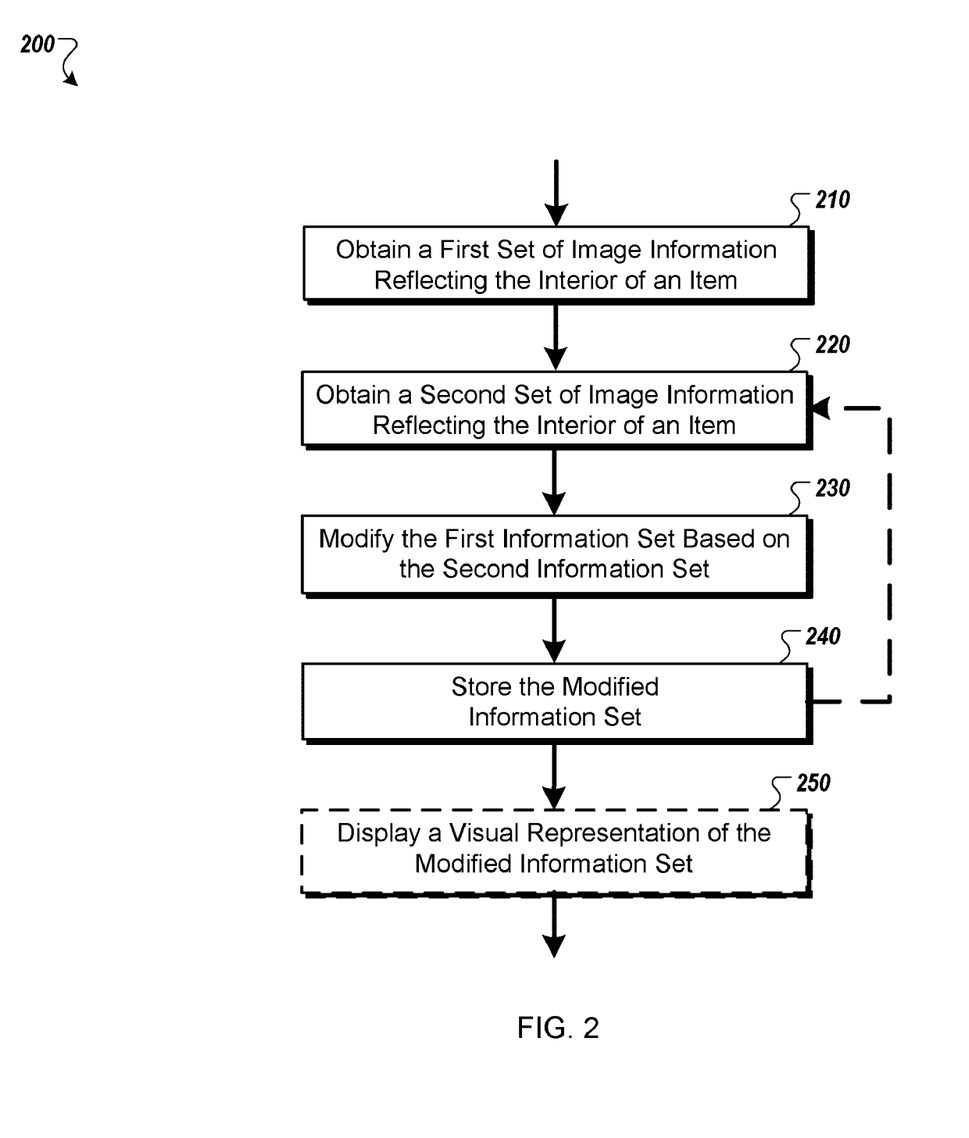
FIG. 2 is a flow diagram representing an exemplary method of modifying image information indicative of the interior of an item.

Referring now to FIG. 2, the imaging system 10 can be used to modify images, for example to reduce or eliminate noise in an image computed from data captured during a CT scan. In some embodiments, a process 200 for modifying data associated with an image depicting at least a portion of the interior of an item can be implemented by the control device 100. As previously described, the system 10 can store information reflecting at least a portion of the interior of an item. In operation 210, the controller device 100 can receive a set of first image information (e.g., from the imaging device 150) and store the first image information in the storage component 110. In operation 220, the controller device 100 can receive a set of second image information (e.g., from the imaging device 150) and store the second image information in the storage component 110. For example, the controller device 100 can receive a thin-slice image and a thick-slice image from the imaging device 150 depicting at least a portion of the interior of an item imaged using computed tomography. In some embodiments, the thick and thin slice images can be images computed from the same set of data obtained during a CT scan. In operation 230, the noise detecting component 120 can modify the first image information obtained during operation 210 using data from the second image information obtained during operation 220. For example, image information from a thick-slice image (e.g., including a higher signal-to-noise ratio) can be used to minimize or eliminate noise from a thin-slice image (e.g., including a lower signal-to-noise ratio). In some embodiments, the controller device 100 can identify similar pixels in the thick and thin image sets and can use intensity information from the higher signal-to-noise ratio thick slice to identify and/or reduce noise in the lower signal-to-noise ratio thin slice. The controller device 100 can store the modified information set in the storage component 110. Optionally, the controller device 100 can display the modified image data on, for example, the LCD display 180 during operation 250.

In some embodiments, the controller device 100 can obtain a set of data reflecting the interior of item captured during a CT scan and can use, for example, the interpolation component 130 to calculate one or more of the first and second sets of image information (e.g., the thick and thin image reconstructions) obtained during operations 210 and 220. For example, the interpolation component 130 can generate thick and thin slice images from the same CT data set representing an internal region of an item. In another example, the interpolation component 130 can generate the first and second sets of image information from data reflecting adjacent regions of an item.

Figure 3:
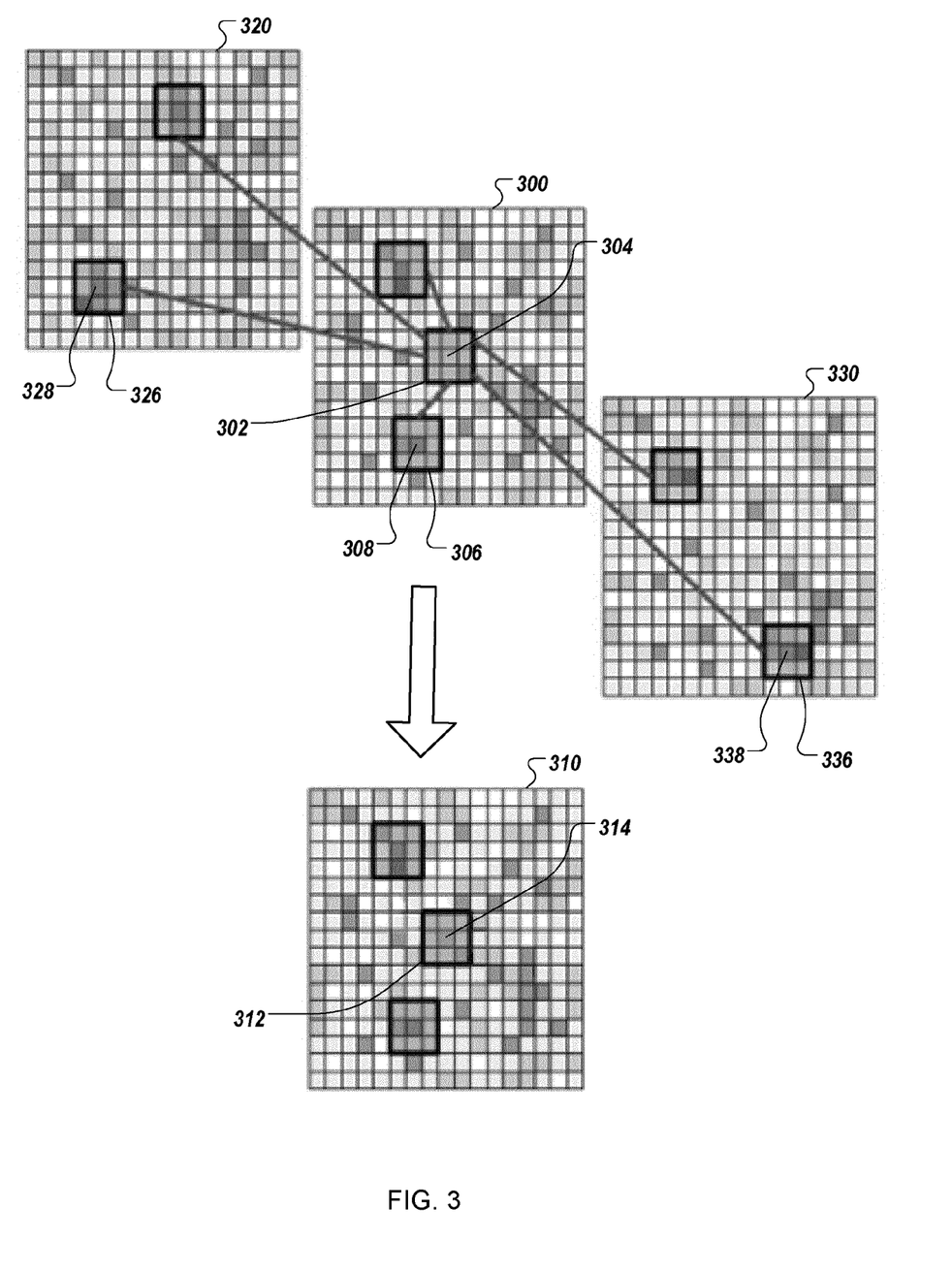
FIG. 3 is a graphical representation of an exemplary method for modifying image information indicative of the interior of an item.

Referring now to FIG. 3, the imaging system 10 can be used to modify images, for example to modify one or more pixel intensities in an image computed from data captured during a CT scan. In some embodiments, the imaging system 10 can reduce or eliminate noise from a first image by modifying the intensity of individual pixels using information obtained from the first image, a second image, a third image, or the like. In some examples, at least one of the second and third images can represent a portion of the interior of the item that is adjacent to the first image. In some examples, at least one of the second and third images can represent a portion of the item that overlaps the portion represented by the first image. As described previously, during one cycle of a CT scan, the imaging system 10 can collect data reflective of one slice of the interior of an item. In some embodiments, the data collected during one cycle can be used to calculate a plurality of two-dimensional image reconstructions representing the slice of the item, where the image reconstructions correspond to different thicknesses. Generally, the thinner the image, the greater the resolution, but the lower the signal-to-noise ratio. For example, two images (e.g., one thick and one thin) can be calculated from the data collected from one cycle. The thin slice can have a higher resolution and a lower signal-to-noise ratio, while the thicker image can have a lower resolution and higher signal-to-noise ratio.

In some embodiments, the imaging system 10 can reduce or eliminate noise from a first image 300 using similar pixels from within the first image 300. For example, a 3×3 pixel patch 302 can contain a pixel 304. To determine if noise exists in the intensity of the pixel 304, the pixel patch 302 can be compared to one or more other 3×3 pixel patches 306. Pixel(s) 308 at the center of patch(es) 306 similar to the patch 302 (e.g., according to one or more pre-determined tests) can be used to modify the intensity of pixel 304 to reduce or eliminate noise associated with the pixel 304. A modified pixel 314 can be saved as part of a modified image 310. This process can be repeated for all pixel(s) 308 that are included as a part of patch(es) 306 that are similar to patch 302. The process of modifying pixels can be repeated for more than one, or for all pixels 304 included in the image 300. In another example, a similarity value is calculated for each comparison of pixel 304 and one of the pixel(s) 308. Each pixel 308 for which a similarity value is calculated can be used to modify the pixel 304 based on the similarity value calculated.

In some embodiments, the imaging system 10 can reduce or eliminate noise from the first image 300 using pixels from within a second image 320. For example, to determine if noise exists in the intensity value of the pixel 304, the pixel patch 302 can be compared to other 3×3 pixel patches 326 in the second image 320 and a similarity value can be calculated. Each pixel 328 at the center of patch(es) 326 can be used to modify the intensity of pixel 304, based on the similarity value, to reduce or eliminate noise associated with the pixel 304. The modified pixel 314 can be saved as part of a modified image 310. This process can be repeated for more than one, or for all pixel(s) 328 that are included as a part of patch(es) 326 in the second image 320. The process of modifying pixels can be repeated for all pixels 304 included in the image 300. In some embodiments, the second image 320 can reflect a slice adjacent to the slice represented by the first image 300. In some embodiments, the second image 320 can reflect a region different than, but not adjacent to, the slice represented by the first image 300. In some embodiments, the second image 320 can reflect a region that includes at least a portion of the region represented by the first image 300. For example, the imaging system 10 can reduce or eliminate noise from the first image 300, a thin-slice reconstruction of a first region using information obtained from the second image 320, a thick-slice reconstruction of the first region.

In some embodiments, the imaging system 10 can reduce or eliminate noise from the first image 300 using pixels from within a third image 330. For example, pixels 338 at the center of patches 336 that are similar to patch 302 (e.g., according to one or more pre-determined tests) can be used to modify the intensity of pixel 304 to reduce or eliminate noise associated with the pixel 304. The modified pixel 314 can be saved as part of a modified image 310. This process can be repeated for more than one, or for all pixels 328 that are included as a part of the patch(es) 336 that are similar to patch 302. The process of modifying pixels can be repeated for all pixels 304 included in the image 300. In some embodiments, more than three images can be used to reduce or eliminate noise from the first image 300.

Figure 4:
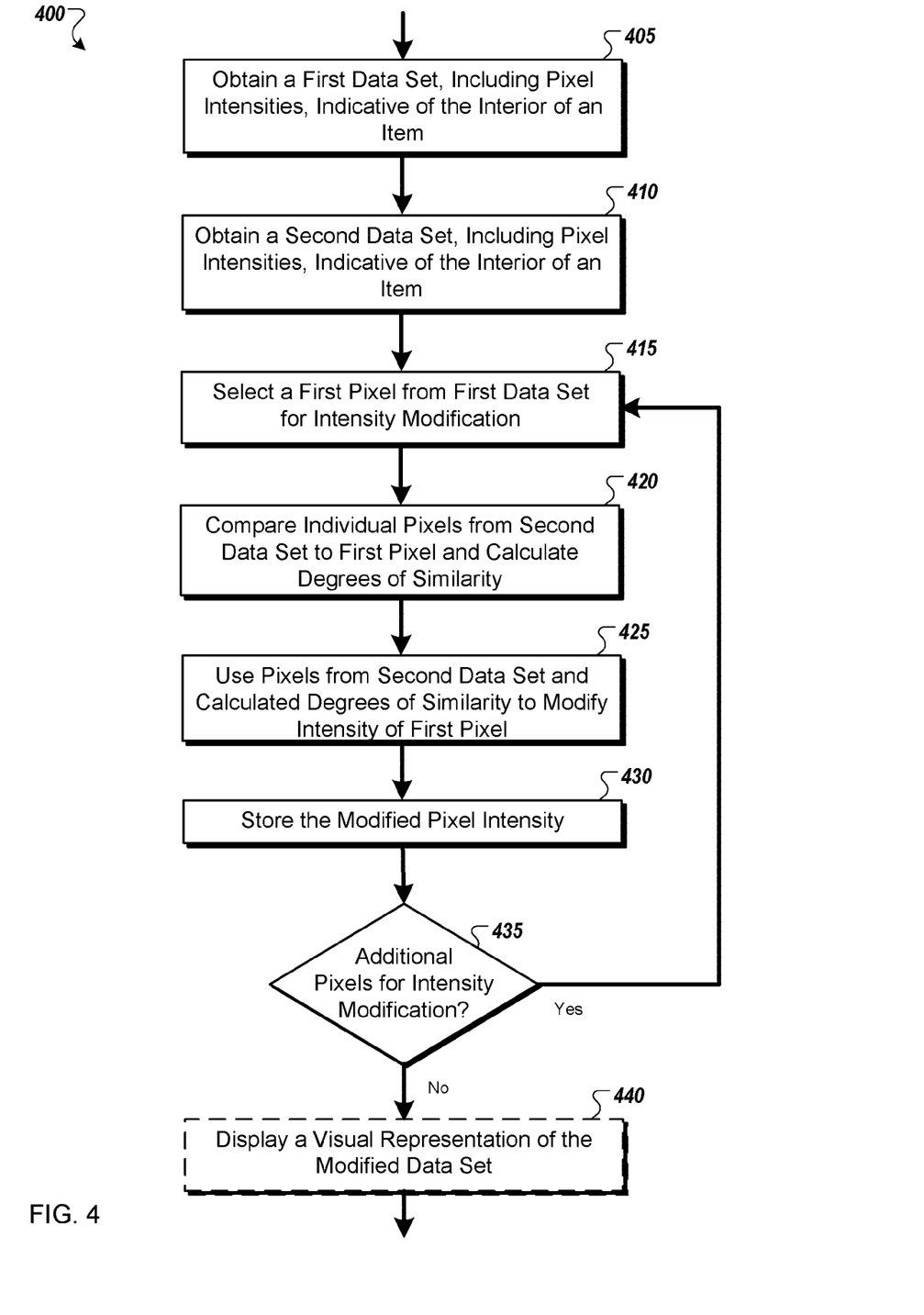
FIG. 4 is a flow diagram representing an exemplary method of modifying the intensity of pixels in a first image using information from a second image.

Referring now to FIG. 4, the imaging system 10 can be used to modify images, for example to reduce noise in an image computed from data captured during a CT scan. In some embodiments, a process 400 for reducing noise from an image depicting at least a portion of the interior of an item can be implemented by the control device 100. As previously described, the system 10 can store thin slice images computed from CT scans.

In operation 405, the controller device 100 can obtain and store a first data set, including pixel intensities and representing an image reconstruction of the interior of an item that can be evaluated for the presence of noise and/or modified to reduce the level of noise. In operation 410, the controller device 100 can obtain and store a second data set, including pixel intensities, representing an image of the interior of an item. For example, the controller device 100 can receive a thin-slice image reconstruction and a thick-slice image reconstruction from the imaging device 150, each depicting at least a portion of the interior of an item imaged using computed tomography. In some embodiments, the thin and thick slice images can each be computed from the same set of CT data obtained during one cycle of the CT imaging device 150 and thus represent substantially the same internal region of a patient.

In operation 415, the noise detecting component 120 can select a first pixel from the first data set. In operation 420, the noise detecting component 120 can compare the first pixel to one or more of the pixels in the second data set and calculate a similarity value for each pixel comparison. This process is described in greater detail in connection with FIG. 5. For example, pixels with similar intensities that have similar environments as the first pixel may have a high similarity value, while pixels of different intensities may have a low similarity value. In operation 425, the one or more pixels compared during operation 420 can be used to modify the intensity of the first pixel. For example, if a similar pixel has a similar but lower intensity, this can indicate that the first pixel has a noise component that can be reduced. In operation 425, the noise detecting component can increase and/or decrease the intensity level of the first pixel based on other pixels and their associated similarity values as calculated in operation 420. In operation 430, the intensity of the first pixel, whether modified or not during operation 425, can be stored as part of a modified image.

In operation 435, the controller device 100 can determine if there are additional pixels in the first data set that can be evaluated for the presence of noise. If additional pixels exist, the process 400 can return to operation 415, where a new pixel is selected from the first data set. Operations 420 through 430 can be repeated until all pixels from the first data set have been evaluated for the presence of noise and/or modified to remove noise. After modification of the first data during operations 420 through 430, the modified data set can be optionally displayed during operation 440 on the display 180.

Figure 5:
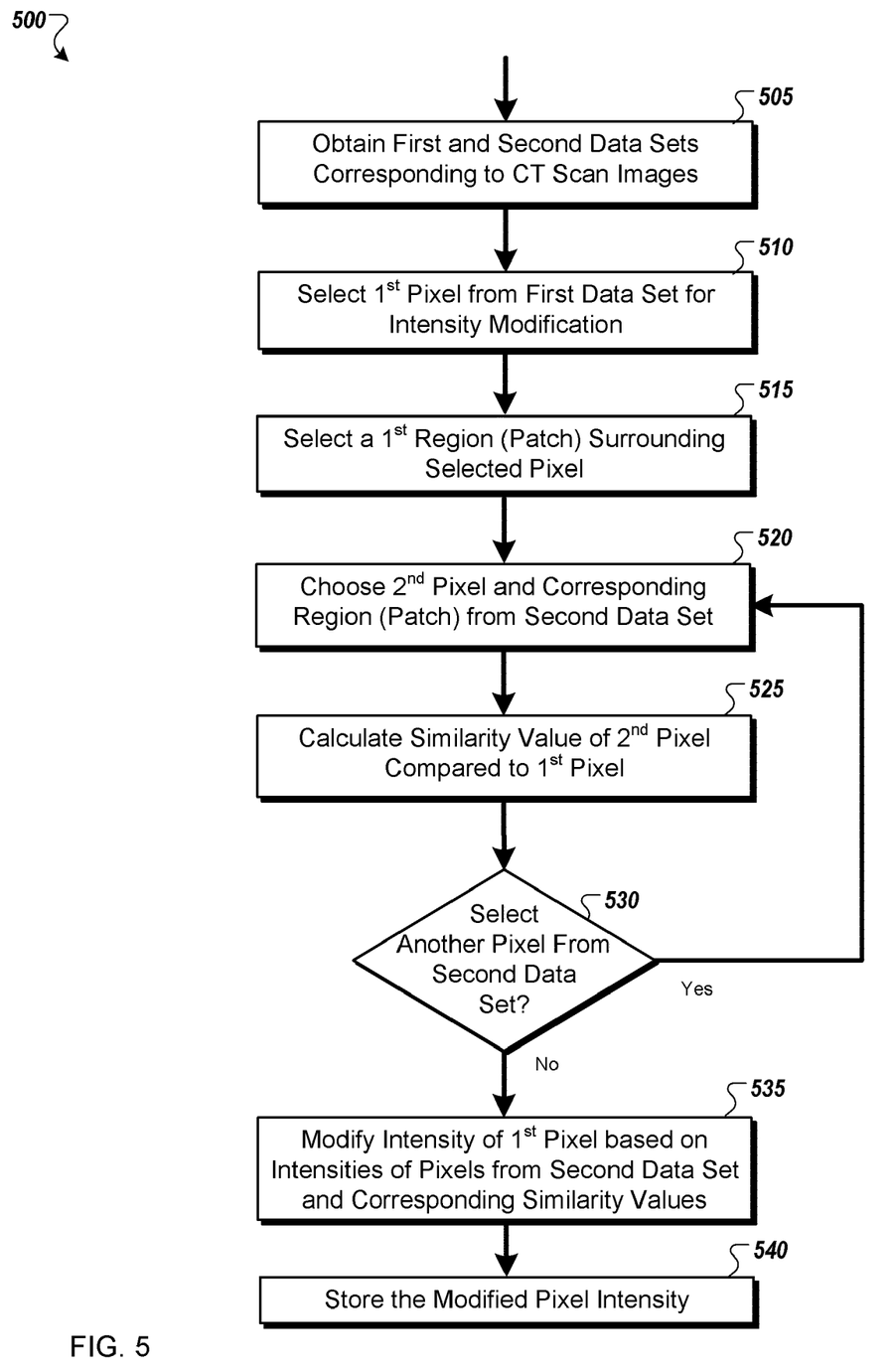
FIG. 5 is a flow diagram representing an exemplary method of choosing pixels from a second image for use in modifying the intensity of a pixel in a first image.

Referring now to FIG. 5, the controller device 100 can utilize a second CT scan image reconstruction to evaluate individuals pixels included in a first CT scan image reconstruction for noise and modify the intensity of the pixels to reduce the noise. In some embodiments, the noise detecting component 120 can compare one or more individual pixels within the second image to a selected first pixel from the first image, calculate similarity values, and use information about the pixels included in the second image and their corresponding similarity values to modify the first pixel. The controller device 100 can repeat this process for all pixels in the first image to reduce noise in the first image.

In some embodiments, a process 500 for comparing pixels to a first pixel and using the compared pixels to identify and reduce noise in the first pixel can be implemented by the controller device 100. In operation 505, the controller device 100 can obtain and store a first data set (e.g., a thin slice reconstruction of a CT scan cycle) and a second data set (e.g., a thick slice reconstruction of a CT scan cycle). In operation 510, the noise detecting component 120 can select a first pixel from the thin slice image for the purpose of identifying and reducing noise in the pixel. In operation 515, the noise detecting component 120 can select a patch of pixels surrounding the first pixel selected in operation 510. The patch of pixels can be a 3 pixel by 3 pixel patch with the first pixel in the center, such as is depicted by patch 302 and pixel 304 in FIG. 3. The noise detecting component 120 can use the selected patch to calculate the similarity of pixels included in the thick slice image to the first pixel.

In some embodiments, during operation 520, the noise detecting component 120 can select a pixel from the thick slice image and a patch of pixels surrounding the selected pixel, where the select patch corresponds to (e.g., contains the same number of pixels as) the patch selected in operation 515 around the first pixel. In operation 525, the noise detecting component 120 can compare the first pixel to the pixel selected in operation 520 and calculate a similarity value. For example, a similarity value can be calculated using the following equation:

$$w(x_i, x_j) = \frac{1}{C_N}\left(1 + \frac{\sum_{\delta \in P}[u(x_i + \delta) - u(x_j + \delta)]^2}{h^2}\right)^{-1}$$

where $C_N$ is a normalizing factor, P denotes the patches around pixels $x_i$ and $x_j$, and h is a smoothing parameter such that higher values decrease the weight difference between similar and dissimilar patches. The equation above can be such that an exact match of the patch receives a weight of 1, and as similarity decreases, the weight approaches 0.

In operation 530, the noise detecting component can determine if there are more pixels from the thick slice image that are to be compared to the first pixel. If additional pixels are available for comparison, the process 500 can return to operation 520 and calculate additional similarity values until no more pixels are available for comparison.

In operation 535, the intensity of the first pixel can be modified to reduce noise. In some embodiments, pixels from the thick slice image that were compared during operation 525 to the first pixel can be used to modify the intensity of the first pixel. For example, the new intensity value of the pixel located at $x_i$ (NLM($x_i$)) after filtering can be a weighted average of neighboring pixels calculated using the following equation:

$$NLM(x_i) = \sum_{x_j \in SW} w(x_i, x_j)u(x_j)$$

where $x_j$ is the location of a pixel located elsewhere in a search window (SW) centered around the pixel $x_i$, and $w(x_i, x_j)$ is the similarity value given $u(x_j)$, the intensity of the pixel located at $x_j$. The similarity values given the pixel intensity values located in the search window can be the similarity values calculated during operation 525 between a local neighborhood, or patch, centered on the pixel from the thick slice image and the same sized patch centered on the first pixel.

In operation 540, the controller device 100 can store the modified pixel intensities in the data storage component 110. The process 500 can repeat operations 510 through 540 for additional, or all pixels, within the thin slice image.

It should be understood that while in the embodiment described above the controller device 100 obtained thick and thin image reconstructions representing CT scan data, the controller device 100 can receive CT scan data and, using for example the interpolation component 130, can calculate one or more of the thick and thin slice image reconstructions.

EXAMPLE 1

The non-local means filtering method proposed by Buades et al. assumes that images possess repeating elements and patterns (A. Buades, B. Coll, and J. M. Morel, *A Review of Image Denoising Algorithms, With a New One*, Multiscale Modeling and Simulation, vol. 4, no. 2, pp. 490-530, 2005). When filtering each pixel, the filter incorporates information from throughout the image, giving equal weight to adjacent and non-adjacent image regions. In practice, the search is often limited to a window around each pixel for reduced computation. Mathematically, this process is a weighted average of neighboring pixels:

$$NLM(x_i) = \sum_{x_j \in SW} w(x_i, x_j) u(x_j)$$

where $NLM(x_i)$ is the new intensity value of the pixel located at $x_i$ after filtering, $x_j$ is the location of a pixel located elsewhere in a search window (SW) centered around the pixel $x_i$, and $w(x_i, x_j)$ is the weight given $u(x_j)$, the intensity of the pixel located at $x_j$. The weights given the pixel intensity values located in the search window are calculated using a similarity function between a local neighborhood, or "patch," centered on the pixel and the same sized patch centered on the pixel being filtered. The function is such that an exact match of the patch receives a weight of 1, and as similarity decreases, the weight approaches 0. In calculating patch similarity, the Euclidean distance is used between each pixel of the patch with a Gaussian weighting such that patch pixels further from the center receive less weight.

Darbon et al. modified the classic Buades non-local means filter to accommodate an integral image implementation by removing the spatial Gaussian weighting when calculating patch similarity (J. Darbon, A. Cunha, T. F. Chan, S. Osher, and G. J. Jensen, *Fast Nonlocal Filtering Applied to Electron Cryomicroscopy*, in Proceedings of ISBI, pp. 1331-1334, 2008). The weighting function is equivalent to:

$$w(x_i, x_j) = \frac{1}{C_N}\left(1 + \frac{\sum_{\delta \in P}[u(x_i + \delta) - u(x_j + \delta)]^2}{h^2}\right)^{-1}$$

where $C_N$ is a normalizing factor, P denotes the patches around pixels $x_i$ and $x_j$, and h is a smoothing parameter such that higher values decrease the weight difference between similar and dissimilar patches. This implementation's use of integral images was shown to significantly decrease computation time from the classic algorithm, a significant hurdle in the use of non-local means.

Two CT scans of an anthropomorphic chest phantom (The Phantom Lab, Cambridge, N.Y.), constructed of material that mimics the CT appearance of tissue, were acquired: one at 120 kVp, 18 mAs, with 1.25 mGy dose (low dose), and the second at 120 kVp, 358 mAs, with 24.18 mGy dose (high dose, nearly 20× higher). Each acquisition was reconstructed as two volumes with different slice thicknesses: 1.5 mm "thin" images and 5 mm "thick" images. For this investigation, Darbon's method was extended to use patch sources other than the specific 2D image being. In particular, the revised method was applied to two-dimensional filtering of low dose, thin slice CT images. To examine the effect of differing parameter values, quantification of filter performance was obtained using the PSNR. The high dose image was used as "ground-truth," and the difference between the lung regions of the filtered image and the high dose image was used to generate PSNR values according to the following equation:

$$PSNR = 20\log_{10}\frac{4095}{\sqrt{MSE}}$$

where MSE is the mean square error between the filtered and ground-truth images, and 4095 is the maximum dynamic range for 12-bit data.

The parameters investigated were the search window size, level of smoothing, patch size, weighting of the original pixel values, and the patch source images used. Multiple search window sizes and then multiple patch sizes were used as the smoothing parameter was incrementally varied through multiple orders of magnitude. The optimal parameters found from these experiments were used while the weight given the original pixel values was varied either as a constant throughout the image, or individually determined as a multiple of the highest similarity weighting calculated. The classic algorithm artificially specifies the weighting of the original pixel values as equal to the maximum weight calculated for the other pixels within the search window. Otherwise, the original pixel weight would always equal 1 due to being an exact patch match with itself Additional patch sources used in filtering the thin image were the corresponding thick slice reconstruction and differing numbers of neighboring thin and/or thick slices. The same search window location and size were used in determining the patches used in each additional filtering image. Filtered images were visually compared to PSNR to support validity of PSNR as a numerical measure of the filter's performance. Finally, the filter was applied to an abdominal CT with the optimal parameters found for 5×5 pixel and 25×25 pixel search windows.

For lower smoothing parameter values, the PSNR increased with the search window size when all other parameters were kept constant. However, this trend reversed for higher smoothing parameter values. The combination of a 5×5 pixel search window and higher smoothing parameter values ultimately produced a higher PSNR than any lower smoothing parameter, large search window combination since increasing the search window size did not significantly increase the PSNR once 25×25 pixels in size. Filter performance decreased as the patch size was increased for both small and larger search window sizes.

Figure 6A:
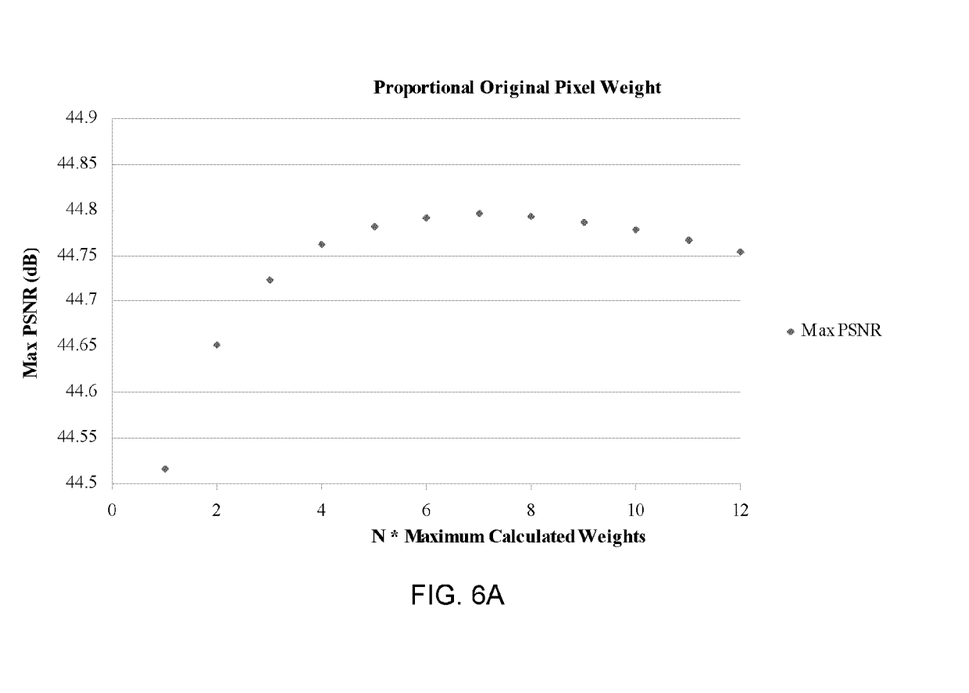
FIGS. 6A-B depict maximum PSNR values for varying original pixel weights.
Figure 6B:
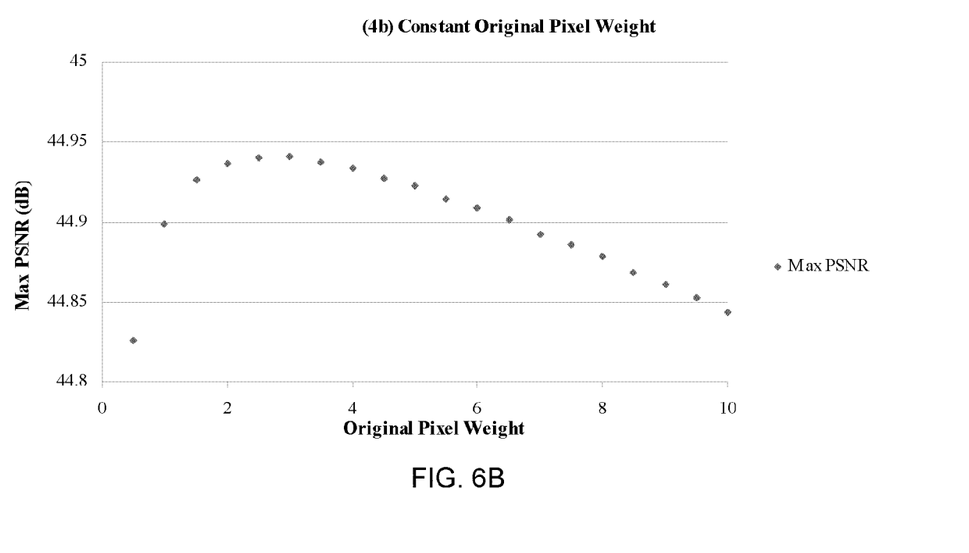

FIG. 6A shows the change in filter performance with regard to the weight given to each original pixel value when set equal to a multiple of the pre-normalized maximum calculated weight for other patches compared to that pixel's patch. For this proportional weighting, filter performance was optimal when this weight was equal to 7 times the maximum weight. However, filter performance was increased further by setting the weight for each original pixel value equal to a constant, the optimal constant being between 2 and 3.5 (FIG. 6B).

Figure 7A:
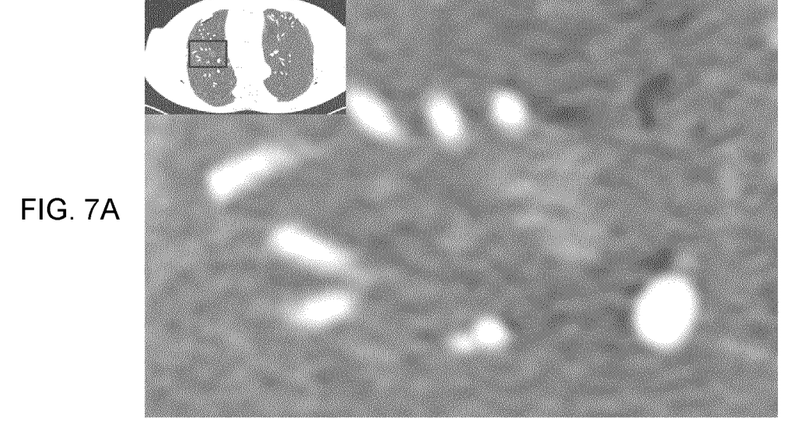
FIG. 7A depicts an unmodified image for use in an exemplary image modification system.
Figure 7B:
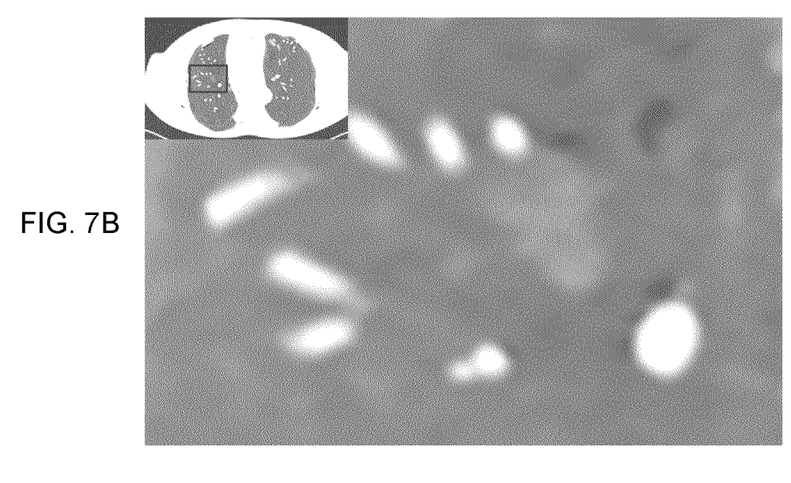
FIGS. 7B-C depict modified images produced by an exemplary image modification system.
Figure 7C:
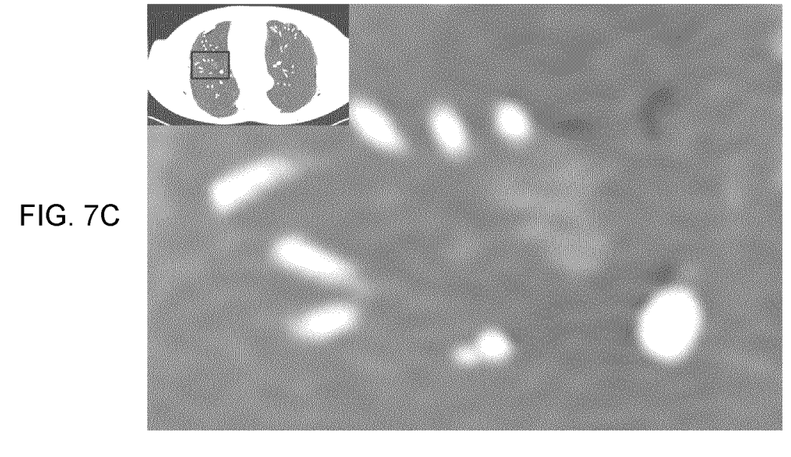

FIGS. 7A-C show original (FIG. 7A) and filtered images of the phantom. FIG. 7B shows the best achieved filtering with a PSNR of 44.94. FIG. 7C shows the best filtering achieved when using the larger search window size of 25×25 pixels.

EXAMPLE 2

Figure 8A:
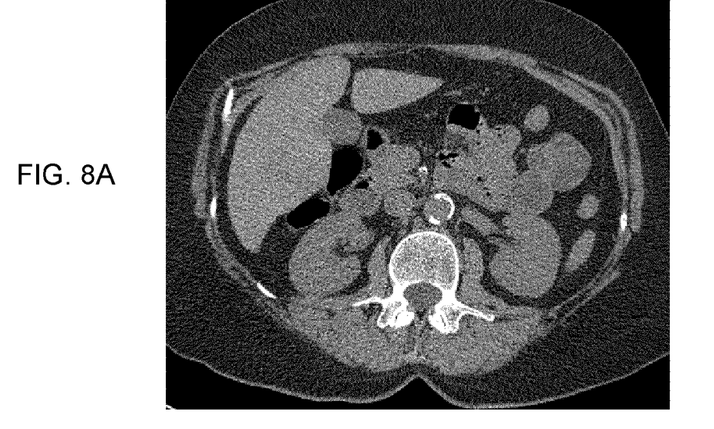
FIG. 8A depicts an unmodified image for use in an exemplary image modification system.
Figure 8B:
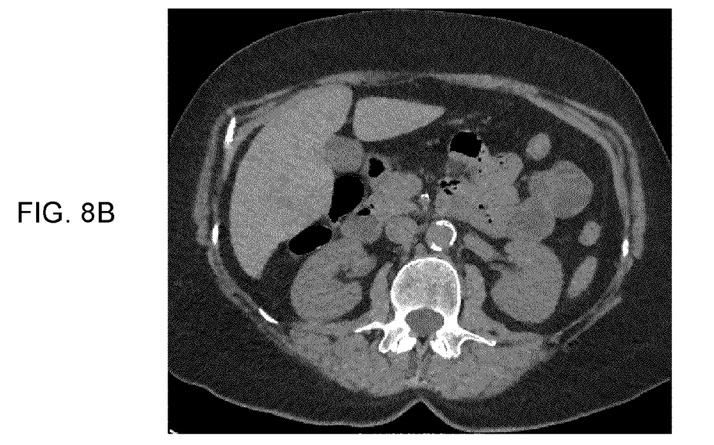
FIGS. 8B-C depict modified images produced by an exemplary image modification system.
Figure 8C:
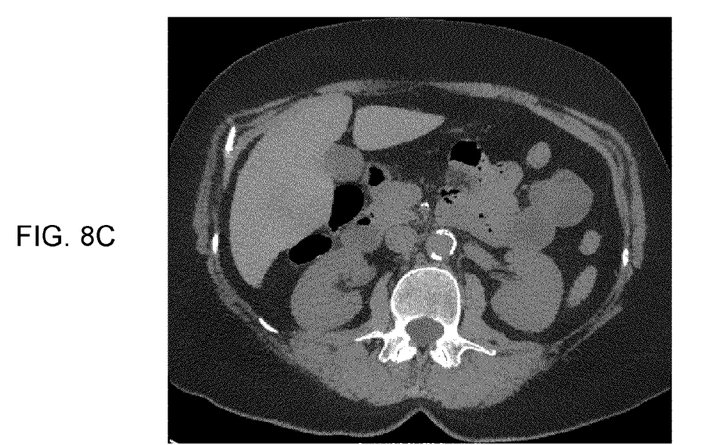

The optimal parameters found during example 1 were used for filtering an abdominal slice (FIGS. 8A-C). FIG. 8A is the original image, FIG. 8B appears acceptable, whereas FIG. 8C appears over-filtered.

In common usage of the non-local means algorithm, the search window size is often limited in order to decrease computation time. However, these results show that through adjustment of the smoothing parameter, a much smaller search window size can increase filter performance with the added benefit of much faster computation due to fewer calculations. Also, the results show that the weight given the original pixel values can be adjusted to give better results than the classic algorithm. Because the weight function (4) lacks intra-patch spatial weighting, patch size may be kept small to allow filtering around high gradient edges within the image. When the patch size is increased without spatial weighting, the size of noisy regions remaining around the edges increased since the chance of finding similar patches was greatly decreased.

A patch bank created from previous, higher dose scans may be able to aid in filtering of low dose, repeat scans of different patients. Combined use of other methods to aid in patch selection could diminish degradation when too many patches are used.

In the previous examples, constraining the filter to two dimension may have helped to maintained computational efficiency, and allow smaller patches for an increased chance of finding similar patches. One potential problem is the chance of obscuring small, longitudinal structures; however, this may be reduced by a pseudo-3-D implementation involving the neighboring slices. Future plans include filtering more phantom slices and types of phantoms, with increased visual assessment of filter performance. In addition to the quantitative evaluation, qualitative evaluation of pathology by trained clinicians to determine filter performance and potential is planned.

Figure 9:
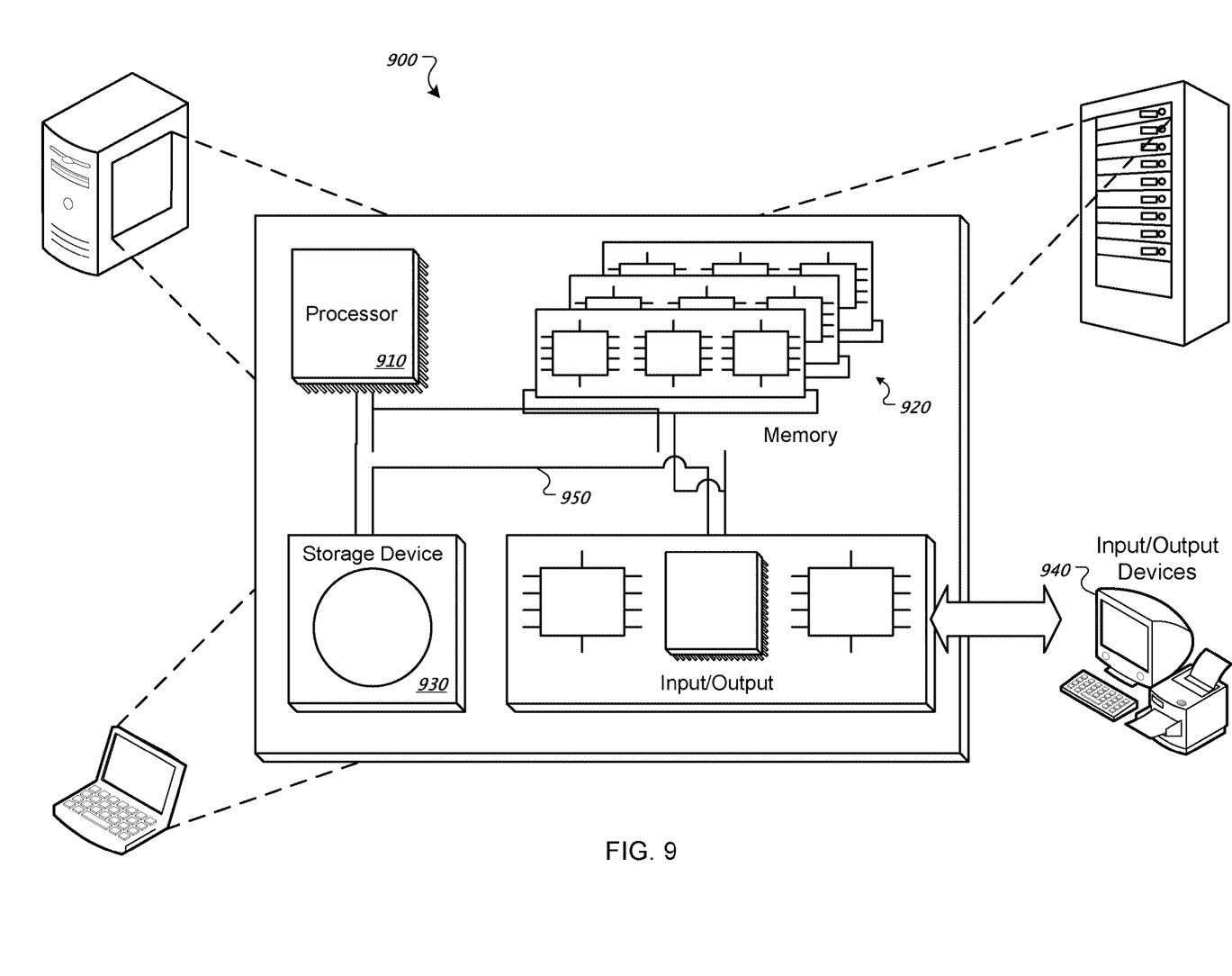
FIG. 9 is a block diagram of a computing system that can be used in connection with computer-implemented methods described in this document.

FIG. 9 is a schematic diagram of a generic computer system 900. The system 900 can be used for the operations described in association with any of the computer-implement methods described previously, according to one implementation. The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In some implementations, the memory 920 is a computer-readable medium. The memory 920 is a volatile memory unit in some implementations and is a non-volatile memory unit in other implementations.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for reducing noise in an image, the method comprising:
   receiving a first image in a computer system, the first image depicting an interior of an item and being generated using a technique that provides imaging at selected depths in the item, the first image representing a first interior section having a first thickness;
   determining a modification for the first image using a second image of the interior, the second image representing a second interior section encompassing the first interior section and having a second thickness greater than the first thickness; and
   storing the modification in association with the first image.

2. The computer-implemented method of claim 1, wherein the technique includes at least one selected from: computer tomography, ultrasound, sound waves, electromagnetic waves, magnetic resonance imaging, magnetic resonance elastography, and combinations thereof.

3. The computer-implemented method of claim 1, wherein the first image is generated by applying an interpolation procedure to the second image.

4. The computer-implemented method of claim 1, wherein also a third image is used in determining the modification, the third image representing a third interior section adjacent the first interior section and having a third thickness less than the second thickness.

5. The computer-implemented method of claim 1, wherein the first and second images comprise pixels, and wherein the modification is stored by adjusting an intensity of a first-image pixel based at least in part on an intensity of a second-image pixel.

6. The computer-implemented method of claim 5, wherein also other first-image pixels from the first image are used in determining the modification.

7. The computer-implemented method of claim 5, wherein the second-image pixel is identified by determining a similarity between: (i) a first patch of the first image that includes the first-image pixel and (ii) a second patch of the second image that includes the second-image pixel.

8. A computer program product tangibly embodied in a non-transitory computer-readable storage medium and comprising instructions that when executed by a processor perform a method for reducing noise in an image, the method comprising: receiving a first image in a computer system, the first image depicting an interior of an item and being generated using a technique that provides imaging at selected depths in the item, the first image representing a first interior section having a first thickness; determining a modification for the first image using a second image of the interior, the second image representing a second interior section encompassing the first interior section and having a second thickness greater than the first thickness; and storing the modification in association with the first image.

9. A computer-implemented method for reducing noise in an image, the method comprising:
   receiving a first image in a computer system, the first image depicting an interior of an item and being generated using a technique that provides imaging at selected depths in the item, the first image representing a first interior section having a first thickness;
   determining a modification for the first image using at least second and third images of the interior representing second and third interior sections, respectively, adjacent the first interior section, the second interior section having a second thickness greater than a third thickness of the third interior section; and
   storing the modification in association with the first image.

10. The computer-implemented method of claim 1, wherein the first image is generated by applying an interpolation procedure to the second image.

11. The computer-implemented method of claim 1, wherein the first, second and third images comprise pixels, and wherein the modification is stored by adjusting an intensity of a first-image pixel based at least in part on intensities of a second-image pixel and a third-image pixel.

12. The computer-implemented method of claim 11, wherein also other first-image pixels from the first image are used in determining the modification.

13. The computer-implemented method of claim 11, wherein the second and third interior sections abut a common side of the first interior section.

14. The computer-implemented method of claim 11, wherein the second and third interior sections abut separate sides of the first interior section.

15. A computer program product tangibly embodied in a non-transitory computer-readable storage medium and comprising instructions that when executed by a processor perform a method for reducing noise in an image, the method comprising: receiving a first image in a computer system, the first image depicting an interior of an item and being generated using a technique that provides imaging at selected depths in the item, the first image representing a first interior section having a first thickness; determining a modification for the first image using at least second and third images of the interior representing second and third interior sections, respectively, adjacent the first interior section, the second interior section having a second thickness greater than a third thickness of the third interior section; and storing the modification in association with the first image.

16. A system comprising:
   a data storage device having stored therein first and second images representing first and second interior sections, respectively, of an item, the first and second images generated using a technique that provides imaging at selected depths in the item, the first interior section encompassed by the second interior section and having a first thickness less than a second thickness of the second interior section; and
   a noise detecting component determining a modification for the first image using the second image.

17. The system of claim 16, further comprising:
   a scanner generating an output that at least partially enters the item; and
   a detector detecting the output from the scanner and generating at least the second image.

18. The system of claim 17, wherein the scanner uses a technique selected from: computer tomography, ultrasound, sound waves, electromagnetic waves, magnetic resonance imaging, magnetic resonance elastography, and combinations thereof.

19. The system of claim 17, further comprising an interpolating component that generates the first image by applying an interpolation procedure to the second image.

20. The system of claim 17, wherein the first and second images comprise pixels, and wherein the noise detecting module determines the modification setting an intensity of a first-image pixel in the first image based at least in part on an intensity of a second-image pixel in the second image.

* * * * *